(12) United States Patent
Koscielski et al.

(10) Patent No.: US 12,472,589 B2
(45) Date of Patent: Nov. 18, 2025

(54) SYSTEM AND METHOD WITH FLOATING WELDER FOR HIGH RATE PRODUCTION WELDING

(71) Applicant: Doben Limited, Windsor (CA)

(72) Inventors: Larry Koscielski, Lasalle (CA); Gregory I. Heuchan, Windsor (CA); Eric Michaud, Amherstburg (CA); Matt Branoff, Lasalle (CA); Darcey D. Renaud, Lasalle (CA)

(73) Assignee: DOBEN LIMITED, Windsor (CA)

( * ) Notice: Subject to any disclaimer, the term of this patent is extended or adjusted under 35 U.S.C. 154(b) by 34 days.

(21) Appl. No.: 18/543,383

(22) Filed: Dec. 18, 2023

(65) Prior Publication Data
US 2024/0116144 A1 Apr. 11, 2024

Related U.S. Application Data

(60) Division of application No. 16/670,136, filed on Oct. 31, 2019, now Pat. No. 11,883,908, which is a
(Continued)

(51) Int. Cl.
*B23K 37/04* (2006.01)
*B21J 15/10* (2006.01)
(Continued)

(52) U.S. Cl.
CPC ........... *B23K 37/0408* (2013.01); *B21J 15/10* (2013.01); *B21J 15/32* (2013.01); *B23K 11/0053* (2013.01);
(Continued)

(58) Field of Classification Search
CPC ....... B21J 15/10; B21J 15/32; B23K 11/0053; B23K 11/0066; B23K 11/115;
(Continued)

(56) References Cited

U.S. PATENT DOCUMENTS

| | | | |
|---|---|---|---|
| 2,685,018 A | 7/1954 | Mynar, Jr. | |
| 2,843,166 A | 7/1958 | Alstyne | |

(Continued)

FOREIGN PATENT DOCUMENTS

| | | |
|---|---|---|
| CA | 1071566 A | 2/1980 |
| CA | 2420929 A1 | 2/2003 |

(Continued)

OTHER PUBLICATIONS

International Search Report and Written Opinion for International Application No. PCT/CA2015/050614 mailed Nov. 23, 2015.
(Continued)

*Primary Examiner* — Steven W Crabb
*Assistant Examiner* — Dilnessa B Belay
(74) *Attorney, Agent, or Firm* — Carlson, Gaskey & Olds, P.C.

(57) ABSTRACT

A securing system, such as a welding system, includes a robot configured to transfer a part to a home position. A securing station has a frame and a gun supported on the frame. The gun includes first and second members movable relative to one another, which are first and second weld gun electrodes, for example. The gun is configured to secure a component to the part in a securing position during a securing operation. A float assembly interconnects the gun to the frame and is configured to permit the gun to glide relative to the welding frame between the home position and the securing position. A homing assembly includes a homing guide configured to release the welding gun from the home position during the securing operation, such as resistance welding fasteners to sheet metal workpieces.

12 Claims, 13 Drawing Sheets

Related U.S. Application Data continuation of application No. 15/120,901, filed as application No. PCT/CA2015/050614 on Jul. 2, 2015, now Pat. No. 10,471,549.

(60) Provisional application No. 62/020,064, filed on Jul. 2, 2014.

(51) Int. Cl.
| | |
|---|---|
| *B21J 15/32* | (2006.01) |
| *B23K 11/00* | (2006.01) |
| *B23K 11/11* | (2006.01) |
| *B23K 11/14* | (2006.01) |
| *B23K 37/047* | (2006.01) |
| *B23P 19/00* | (2006.01) |
| *B23P 19/04* | (2006.01) |
| *B65G 19/02* | (2006.01) |
| *B65G 47/24* | (2006.01) |
| *B65G 47/244* | (2006.01) |

(52) U.S. Cl.
CPC ......... *B23K 11/0066* (2013.01); *B23K 11/115* (2013.01); *B23K 11/14* (2013.01); *B23K 37/047* (2013.01); *B23P 19/00* (2013.01); *B23P 19/001* (2013.01); *B23P 19/04* (2013.01); *B65G 19/02* (2013.01); *B65G 47/24* (2013.01); *B65G 47/244* (2013.01)

(58) Field of Classification Search
CPC .. B23K 11/14; B23K 37/0408; B23K 37/047; B23P 19/04; B65G 19/02; B65G 47/24; B65G 47/244
USPC .......................................................... 219/80
See application file for complete search history.

(56) References Cited

U.S. PATENT DOCUMENTS

| | | | |
|---|---|---|---|
| 2,905,803 A | 9/1959 | Brady, Jr. | |
| 3,233,752 A | 2/1966 | Lagler et al. | |
| 3,415,350 A | 12/1968 | Murphy | |
| 4,020,316 A * | 4/1977 | Schaft | B23K 11/0053 |
| | | | 219/93 |
| 4,215,262 A | 7/1980 | Brastow | |
| 4,341,502 A | 7/1982 | Makino | |
| 4,678,073 A | 7/1987 | Anderson et al. | |
| 4,754,116 A | 6/1988 | Naruse et al. | |
| 4,776,447 A | 10/1988 | Pitcher | |
| 4,789,768 A | 12/1988 | Tobita et al. | |
| 4,893,402 A | 1/1990 | Hirasaka et al. | |
| 4,929,146 A | 5/1990 | Koster et al. | |
| 5,316,123 A | 5/1994 | Achelpohl | |
| 5,513,428 A | 5/1996 | Shiramizu et al. | |
| 5,530,218 A * | 6/1996 | Nakamura | B23K 11/314 |
| | | | 219/86.25 |
| 5,626,238 A | 5/1997 | Blanc | |
| 6,163,004 A | 12/2000 | Aoyama et al. | |
| 6,415,902 B1 | 7/2002 | Vis et al. | |
| 6,481,560 B2 | 11/2002 | Kearney | |
| 6,720,517 B2 | 4/2004 | Kato et al. | |
| 6,875,946 B2 | 4/2005 | Hidaka | |
| 8,294,064 B1 | 10/2012 | Raiche et al. | |
| 8,875,868 B2 | 11/2014 | Auf der Maur | |
| 2001/0050207 A1 | 12/2001 | Kearney | |
| 2003/0107581 A1 | 6/2003 | Ritter et al. | |
| 2003/0127432 A1 | 7/2003 | Aoyama et al. | |
| 2005/0150874 A1* | 7/2005 | Cabanaw | B23K 11/253 |
| | | | 219/93 |
| 2006/0113945 A1 | 6/2006 | Stahs | |
| 2009/0200139 A1 | 8/2009 | Kissee et al. | |
| 2010/0059486 A1 | 3/2010 | Aoyama et al. | |
| 2010/0108466 A1 | 5/2010 | Herzog | |
| 2012/0318637 A1 | 12/2012 | Ito et al. | |
| 2014/0014469 A1 | 1/2014 | Fredrickson et al. | |

FOREIGN PATENT DOCUMENTS

| | | | | |
|---|---|---|---|---|
| CA | 2418697 A1 | 9/2003 | | |
| CN | 1775447 A | 5/2006 | | |
| CN | 102873448 A | 1/2013 | | |
| DE | 4339398 A1 | 6/1994 | | |
| DE | 102011013390 A1 * | 11/2011 | .......... | B23K 11/115 |
| EP | 1762326 A2 | 3/2007 | | |
| FR | 2557537 A1 | 7/1985 | | |
| GB | 2297969 A | 8/1996 | | |
| JP | S50127365 A | 10/1975 | | |
| JP | S6231616 A | 2/1987 | | |
| JP | H06183542 A | 7/1994 | | |
| JP | H0677978 U | 11/1994 | | |
| JP | 07012546 B2 | 2/1995 | | |
| JP | H07285648 A | 10/1995 | | |
| JP | H07314155 A | 12/1995 | | |
| JP | 09024474 A | 1/1997 | | |
| JP | H09295162 A | 11/1997 | | |
| JP | 3094151 B2 | 10/2000 | | |
| JP | 2003320463 A | 11/2003 | | |
| JP | 4186167 B2 | 11/2008 | | |
| NL | 7705670 A | 11/1978 | | |
| WO | 2007074561 A1 | 7/2007 | | |
| WO | 2014030261 A1 | 2/2014 | | |
| WO | 2012172516 | 4/2014 | | |

OTHER PUBLICATIONS

International Search Report and Written Opinion for International Application No. PCT/CA2015/050613 mailed Sep. 22, 2019.
International Preliminary Report on Patentability for International Application No. PCT/CA2015/050613 mailed Oct. 5, 2016.
International Preliminary Report on Patentability for International Application No. PCT/CA2015/050614 mailed Jan. 12, 2017.
Supplementary Partial European Search Report for European Application No. 15814446.9 mailed Aug. 14, 2018.
Supplementary European Search Report for European Application No. 15815660.4 mailed Mar. 9, 2018.
European Examination Report for European Application No. 15815660.4 mailed Aug. 12, 2020.
Chinese Office Action for Chinese Application No. 201911254635.3 mailed Jan. 25, 2021.

* cited by examiner

SYSTEM AND METHOD WITH FLOATING WELDER FOR HIGH RATE PRODUCTION WELDING

CROSS-REFERENCE TO RELATED APPLICATIONS

This application is a divisional of U.S. patent application Ser. No. 16/670,136, which was filed Oct. 31, 2019, which is a continuation of U.S. patent application Ser. No. 15/120,901, which was filed on Aug. 23, 2016, now granted U.S. Pat. No. 10,471,549 issued on Nov. 12, 2019, which is a United States National Phase Application of PCT Application No. PCT/CA2015/050614, filed Jul. 2, 2015, which claims priority to U.S. Provisional Application No. 62/020,064, which was filed on Jul. 2, 2014 and is incorporated herein by reference.

BACKGROUND

This disclosure relates to a welding system and welder used, for example, to secure fasteners to stampings.

The production of complex assemblies such as vehicles, appliances, consumer goods, and furniture often requires the fabrication of welded subassemblies, such as sheet metal workpieces with one or more welded fasteners. In the production of an assembly as complex as a vehicle, there can be a considerable quantity and variety of such sheet metal workpieces that are produced in a stamping operation for later welding in batches to produce the required welded subassemblies. A machine operator must remove a randomly oriented and sometimes interlocked sheet metal workpiece from the storage bin before loading it into the welding machine. A second component is then added manually or by automation in preparation for welding. In the case of resistance welding, two electrodes close upon the workpiece and second component before applying force and a high current necessary for completing the resistance weld. The finished subassembly is then removed from the machine in preparation for repeating the welding operation.

As automotive component production costs continue to be pressured lower, labor productivity is under increased scrutiny. The common direction in the industry is to replace labor with significant automation. To be competitive, it is important to maximize the productivity of both the equipment and operator. Much effort is being directed to address this challenge by building equipment with elements such as one or more fixtures to orient the workpiece or complex vision systems that permit a robot to accurately grasp and position the workpiece. Such systems can be challenging to set-up and may require specialized and costly skills to configure, troubleshoot and maintain. The problem this approach has created is equipment that is too hard for many customers (or specific plants) to set-up, operate and maintain. Some cannot access skilled labor, or they do not have enough complex equipment to justify investment in skilled labor and tools. Excessive sophistication may limit the operational reliably in the production environment. The complexity also increases the capital cost of the equipment and the inventory of spare parts to keep it in operation.

It is desirable to use equipment that is simple to configure, operate, troubleshoot, and maintain. It is also desirable to minimize the equipment changeover time while also minimizing its complexity.

SUMMARY

In one exemplary embodiment, a securing system includes a robot that is configured to transfer a part to a home position. A securing station includes a frame with a gun supported on the frame. The gun includes first and second members movable relative to one another. The gun is configured to secure a component to the part in a securing position during a securing operation. A float assembly interconnects the gun to the frame. The float assembly is configured to permit the gun to glide relative to the welding frame between the home position and the securing position. A homing assembly includes a homing guide that is configured to release the welding gun from the home position during the securing operation.

In a further embodiment of the above, the securing station is a welding station that includes a feeder supported by the frame. The first and second members are first and second electrodes. The feeder is configured to slide relative to the home position between feeder advanced and feeder retracted positions. The component is arranged over the second electrode in the feeder advanced position.

In a further embodiment of any of the above, the feeder is configured to provide the component to the gun with the second electrode in an electrode advanced position. The component is a fastener.

In a further embodiment of any of the above, the second electrode is movable between electrode retracted and electrode advanced positions.

In a further embodiment of any of the above, the second electrode includes a pin movable between pin advanced and pin retracted positions with the second electrode in the electrode advanced position.

In a further embodiment of any of the above, the pin engages the component with the feeder in the feeder advanced position and the pin in the pin advanced position.

In a further embodiment of any of the above, the feeder is configured to move from the feeder advanced position to the feeder retracted position with the component loaded on the pin. The component is configured to be released by a release mechanism when moving to the feeder retracted position.

In a further embodiment of any of the above, the feeder includes opposing jaws biased to a component retaining position by springs. The jaws are configured to release the component and overcome the springs as the feeder moves from the feeder advanced position to the feeder retracted position.

In a further embodiment of any of the above, the feeder includes a clamp that is configured to retain a second component behind a first component. The first component is loaded on the pin. The clamp is configured to cycle and permit the second component to advance to the jaws for subsequent loading onto the pin.

In a further embodiment of any of the above, the float assembly includes links that interconnect the gun to the frame. The links are configured to permit the gun to move in a horizontal plane.

In a further embodiment of any of the above, the homing assembly includes a pin that selectively cooperates with a guide to retain the gun in the home position.

In a further embodiment of any of the above, the guide includes arms that selectively engage the pin to locate the gun within a horizontal plane.

In a further embodiment of any of the above, the control system evaluates the electrode and pin positions to identify, contain, and remediate workpiece and operating fault conditions.

In a further embodiment of any of the above, the control system contains a schedule of parameters corresponding to a number of assembly configurations.

In another exemplary embodiment, a method of manufacturing an assembly including the steps of loading a part into an assembly station and permitting the assembly station to float relative to the part. A component is secured to the part at the assembly station while performing the permitting step.

In a further embodiment of any of the above, the component is a fastener. The assembly station is a welding station. The securing step includes welding the fastener to the part.

In a further embodiment of any of the above, the loading step includes the step of robotically transferring the part to the assembly station with the assembly station in a home position. The permitting step includes releasing the assembly station from the home position subsequent to performing the step of robotically transferring the part.

In a further embodiment of any of the above, the method includes the step of loading the component onto an electrode with a feeder and retracting the feeder subsequent to the component loading step. The feeder retracting step is performed prior to the permitting step.

In a further embodiment of any of the above, the method includes the step of advancing the electrode to engage the part during the permitting step.

In a further embodiment of any of the above, the component is a first component and includes the steps of clamping a second component in the feeder, releasing the first component during the feeder retracting step and performing the step of unclamping the second component.

In a further embodiment of any of the above, the feeder retracting step includes overcoming spring biased jaws in the feeder.

In a further embodiment of any of the above, the method includes the step of picking up the part off of a drag conveyor prior to the part loading step.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

The disclosed system provides low-cost automation to weld fasteners, or secure other parts such as pins, clips, or brackets to sheet metal stampings at high speeds. The same system can be applied to other assembly processes such as rivets, self-piercing fasteners, mechanical fasteners to a variety of workpieces including those made of plastic. Thus, although the disclosed system is discussed primarily in terms of a welding system and method, it should be understood that other types of securing systems are contemplated.

Figure 1:
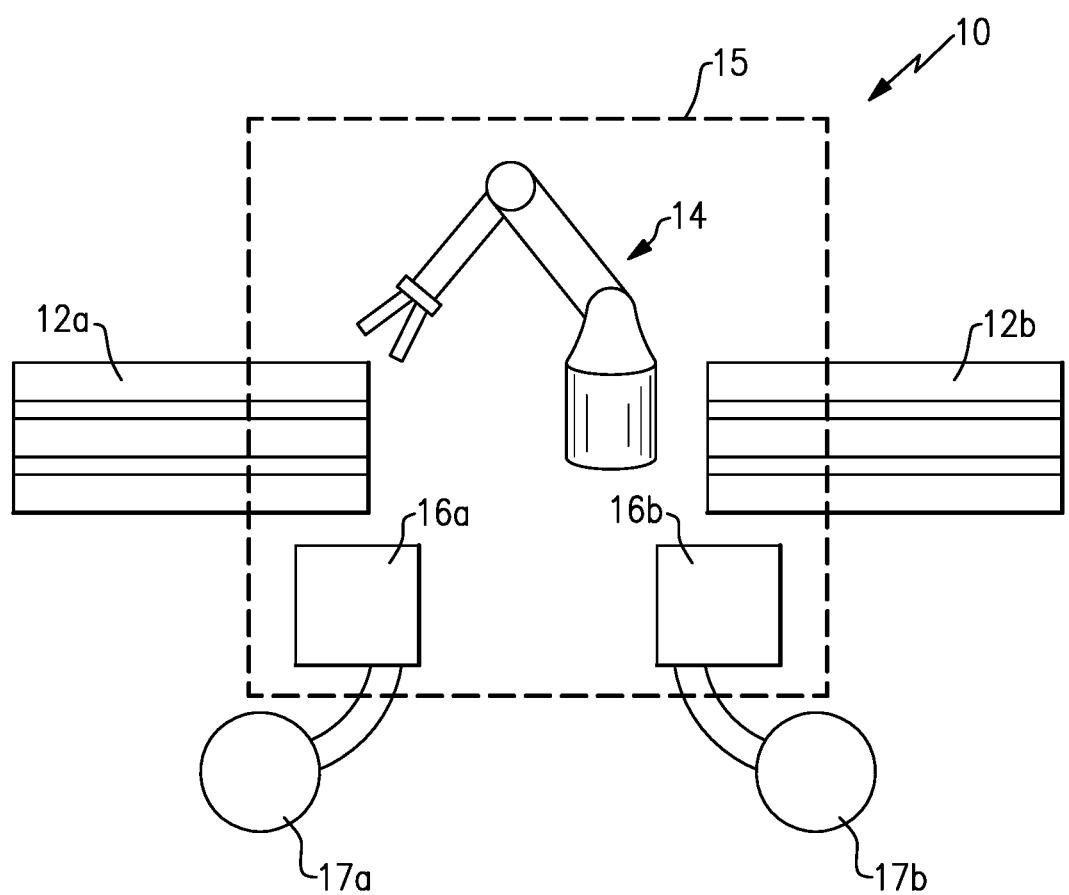
FIG. 1 is a highly schematic view of a welding cell embodiment.

A welding system 10 is schematically illustrated in FIG. 1. First and second conveyors 12a, 12b feed different parts, such as stampings, into a robot 14 within a welding station 15. The robot 14 transfers the parts from the conveyors 12a, 12b to welding machines 16a, 16b. One welding machine 16a secures studs supplied by a vibratory feeder bowl 17a, and the other welding machine 16b secures nuts supplied by a vibratory feeder bowl 17b. The arrangement shown in FIG. 1 is exemplary only and may be configured differently than illustrated.

Figure 2:
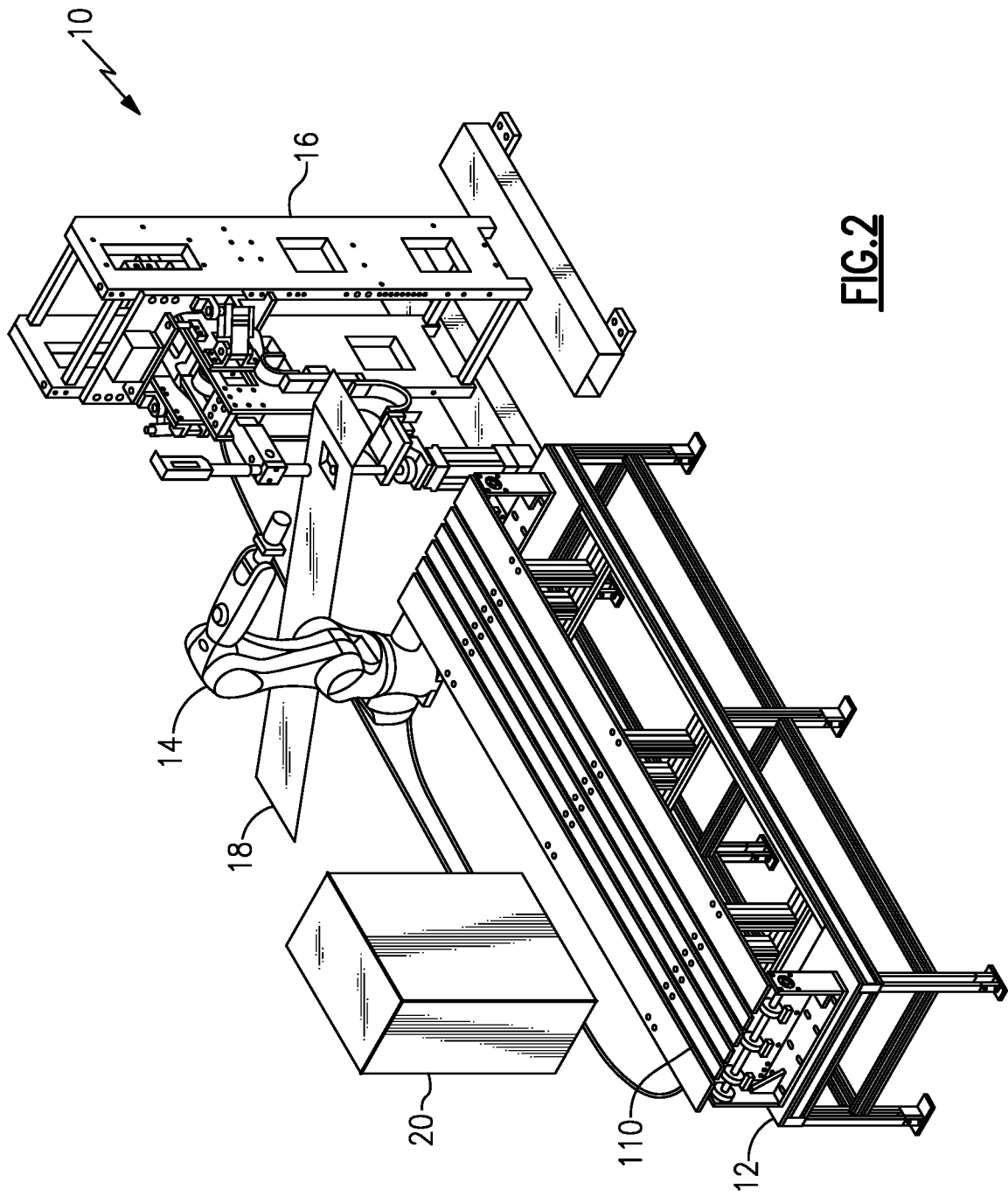
FIG. 2 is a simplified perspective view of a welding system embodiment without guarding or material handling.

FIG. 2 shows one example welding system 10 for high-rate production in more detail that includes a drag conveyor 12, high-speed robot 14, welding machine 16, unload chute 18, and control system 20. The drag conveyor 12 provides a number of equally spaced load stations, each having a transfer pins 110 for engaging a workpiece to which a component such as a fastener will be welded. The drag conveyor 12 advances workpieces loaded by an operator onto transfer pins 110 at one end towards an unload end (shown in more detail in FIG. 10). The high-speed robot 14 is positioned in close proximity to the unload end of the drag conveyor 12 where it will grasp a workpiece and the welding machine 16 to which it will present the workpiece for welding. A control system 20 is interconnected to each of the elements of the welding system 10 to provide functional control and coordination of the motions of the elements to minimize the operating cycle time. In one example, the welding system 10 may be configured to weld more than thirty or more different assemblies. The control system 20 maintains data for each assembly needed to manage the position and number of fasteners in each assembly, instructions for when the robot can release the assembly, error recovery protocols, weld signatures, and other information for automating the welding of the assembly.

With continuing reference to FIG. 2, the welding system 10 is configured to accept a workpiece W (FIG. 10) such as a sheet metal stamping and weld a component part to it, such as a fastener F (e.g., FIGS. 5A-6B), in the shortest time possible. The individual stations of a drag conveyor 12 include a transfer pin 110 which engages in a hole in the workpiece to pull the workpiece W from the loading point to an unloading point. The geometry and mass of the workpiece W will determine its attitude when resting on the drag conveyor 12 and engaged with the transfer pin 110. Friction between the bed of the drag conveyor 12 and the workpiece W is sufficient to urge all of the workpieces into a sufficiently consistent orientation as they are moved towards the unload position.

The number and spacing of the transfer pins 110 will determine the length and width of the drag conveyor 12. The diameter of the transfer pins 110 is selected to engage the hole in the range of workpieces to be welded, have sufficient strength to minimize bending, and to provide some clearance between the hole and workpiece W so the high-speed robot 14 can reliably remove the workpiece W. The length of the transfer pin 110 is based on the height above the drag conveyor 12 where the workpiece engages the transfer pin 110. The height of the drag conveyor 12 depends on whether it is to be manually loaded at a convenient height for an operator, or by automation directly from the stamping equipment used in production of the workpiece.

The welding system 10 shown in FIG. 2 is includes a drag conveyor 12 having three rows of twenty four stations. The number of rows and stations depends on a number of factors such as permissible floorspace, workpiece loading time, welding sequence time, buffer inventory requirement, and interaction between workpieces in adjacent stations.

The high-speed robot 14 is programmed to properly grasp the workpiece W from a station at the unload end of the drag conveyor 12 and transition it to an attitude and position necessary to engage with the welding machine 16. Since the tooling uses a simple transfer pin 110, there is no requirement beyond programming, for tooling or tool set-up to accommodate different workpieces.

The high-speed robot 14 and the welding machine 16 are coordinated by a control system 20 to engage the workpiece W with the welding machine 16 as quickly as possible so the welding process can be completed and the completed assembly discharged from the welding system 10. The welding machine 16 includes provisions, such as the float assemblies illustrated in FIGS. 7A-9, for accommodating some misalignment of the workpiece due to variation of the attitude of the workpiece on the drag conveyor 12 and positioning error of the high-speed robot 14 plus any positioning error due to variations in the workpiece W, or movement of the workpiece W in the gripping device of the high-speed robot 14 during the workpiece transfer.

In further detail, with continuing reference to FIG. 2, the size and configuration of the welding system are suited to the range of assemblies to be welded. The welding machine 16 capability, including its physical size, welding current or power capability, and electrode force range are determined by the workpiece characteristics and the requirements of the welding process. The configuration and height of the unload chute 18 is based on the type of container in which the completed weldment is discharging.

The welding machine 16 shown in FIG. 2 is a resistance welding machine configured for welding projection weld nuts. It could also be configured to weld projection weld studs, to weld by other means such as laser welding, or to perform other processes such as assembly. The versatility of the welding system 10 can be expanded by incorporating multiple welding machines 16 that weld different sized fasteners F (e.g., FIGS. 5A-6B) or different types of operations. These either can be located within easy reach of the high-speed robot, manually repositioned, or supplied with automation to index one or more welding machines 16 to the active position within the reach of the high-speed robot 14.

Figure 3:
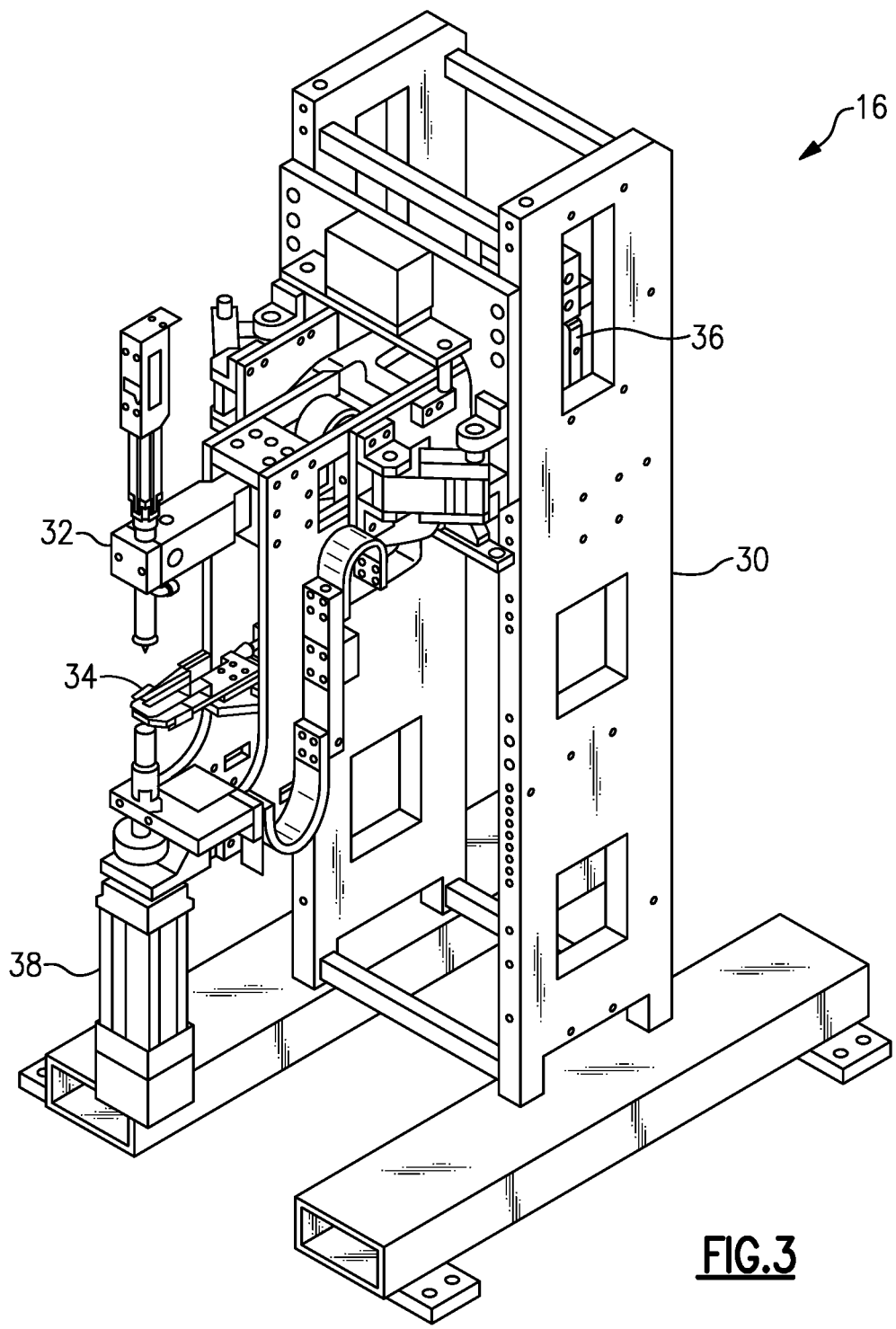
FIG. 3 is a simplified perspective view of a welding machine.

The welding machine 16 as shown in FIG. 3 includes a welding machine frame 30 supporting a resistance welding gun 32 and a feeder 34 for delivering a fastener F to be welded to a workpiece W. The welding machine frame 30 maintains the alignment and orientation of the components and includes provisions for leveling to ensure the desired function. The resistance welding gun 32 supports a resistance welding transformer 36 to produce the required welding current and a welding actuator 38 for achieving the required coordinated motion of the welding electrodes and the necessary electrode force for welding. The resistance welding transformer can be of any type, such as alternating current or inverter. The resistance welding gun is oriented to exploit gravity to maintain engagement with the fastener F delivered by a feeder 34 as it is moved to the welding position. The feeder 34 dispenses one fastener F to be welded to the workpiece at a time onto the movable welding electrode 44.

The feeder 34 shown is for feeding projection weld nuts. The design of the feeder 34 will be based on the requirements of the fastener F to be welded and may for example be a stud, pin, or bracket; or other process such as feeding of a rivet, screw, clinch nut, mechanical clip, or other mechanical fastener. Thus, the welding machine 16 can employ a process other than resistance welding or a process that does not involve such mechanical fastening involving riveting, self-piercing fastener, bolting, or the like.

The welding machine frame 30 is rigid enough to ensure consistency of the resistance welding gun 32 position when the mass of the gun is shifting and when it is subjected to external forces. When a welding cycle is requested, the welding actuator 32 extends to a position that is aligned with the feeder 34 when it advances to deliver a component to be welded. When the feeder 34 retracts to its home or feeder retracted position, the welding actuator 32 extends fully to close the electrodes and press the fastener F to be welded against the workpiece W positioned by the high-speed welding robot 14. During the welding sequence, welding current delivered by the resistance welding transformer 36 creates the heat for welding. At the completion of the weld, the output of the welding actuator 38 is retracted to return the moveable welding electrode 44 to its home or electrode retracted position.

The welding machine frame 30 of FIG. 3 holds the resistance welding gun 32 at the required working height determined in large part by the required height of the unload chute 18 or by clearance necessary to ensure there is no interference with the operation of the resistance welding gun 32. The resistance welding gun 32 is sized to accommodate the physical size of the workpiece W or workpieces, and the required electrode force and welding current. The stroke of the welding actuator 38 is determined by the required resistance welding gun 32 opening and that in turn determines the length of the welding actuator 38.

Figure 4:
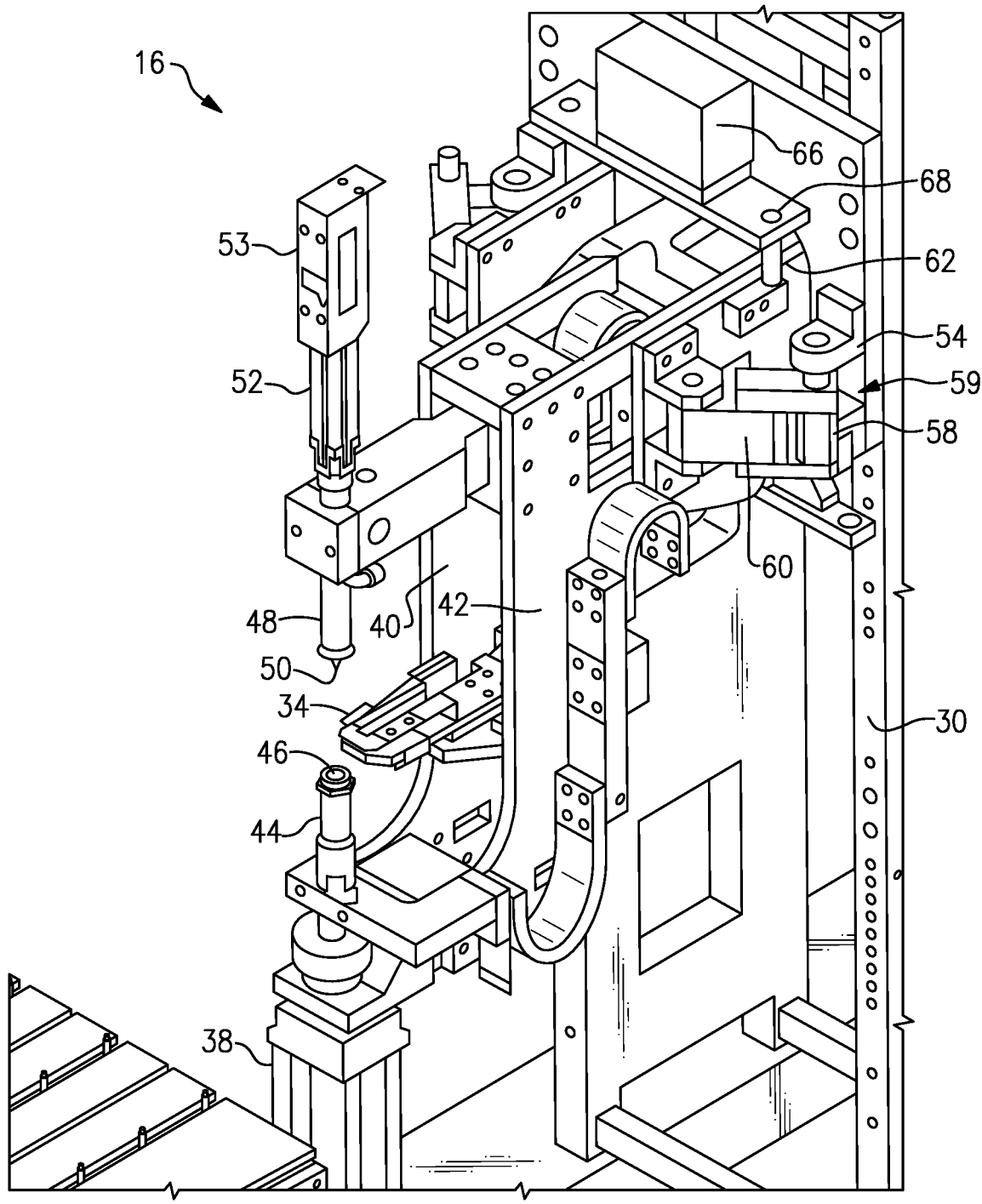
FIG. 4 is an enlarged perspective view of the resistance welding gun incorporated in the welding machine.
Figure 5A:
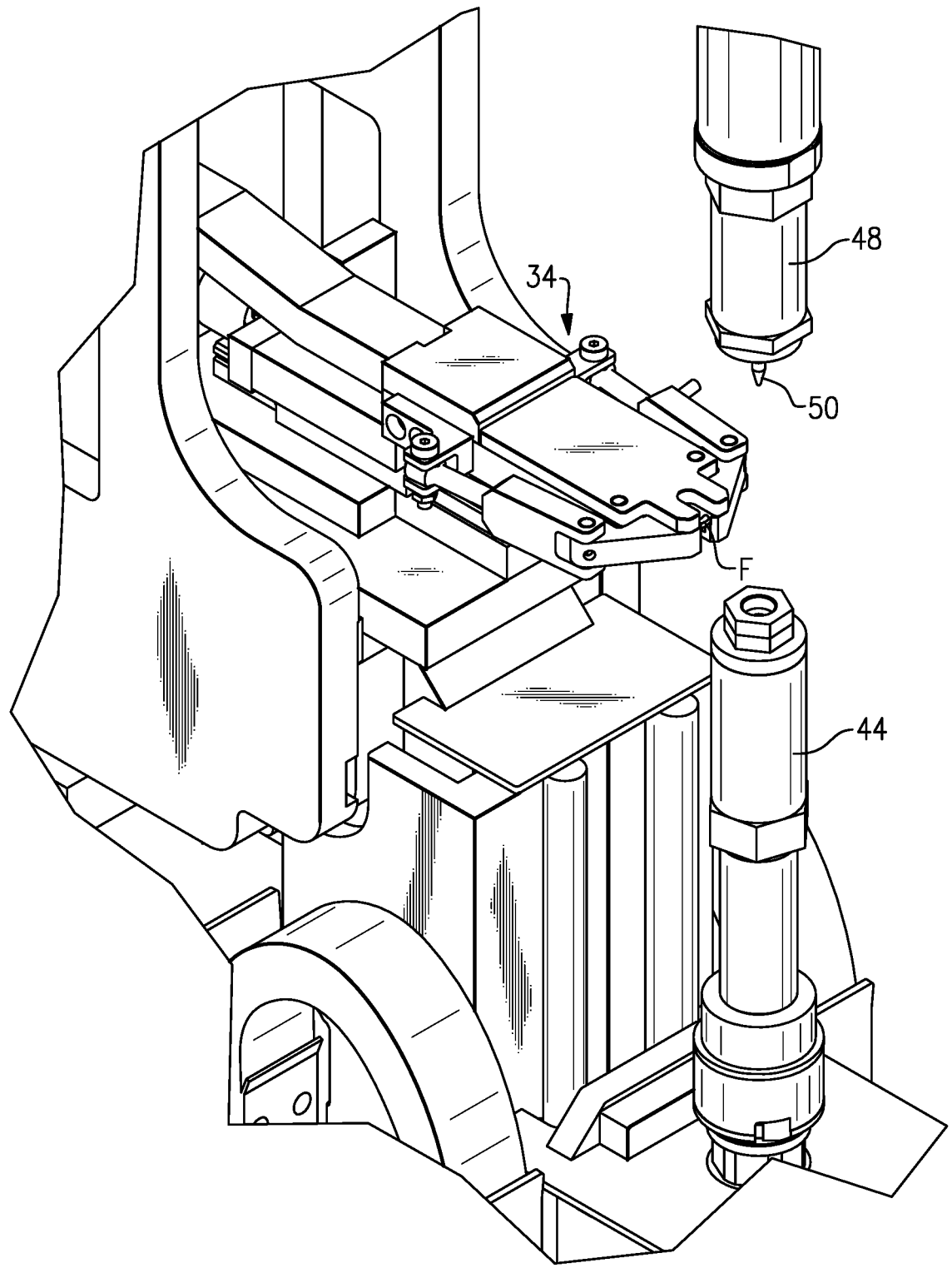
FIG. 5A is another enlarged perspective view depicting the welding gun with a fastener feeder in a feeder retracted position, a pin in a pin retracted position, and an electrode in an electrode advanced position.
Figure 5B:
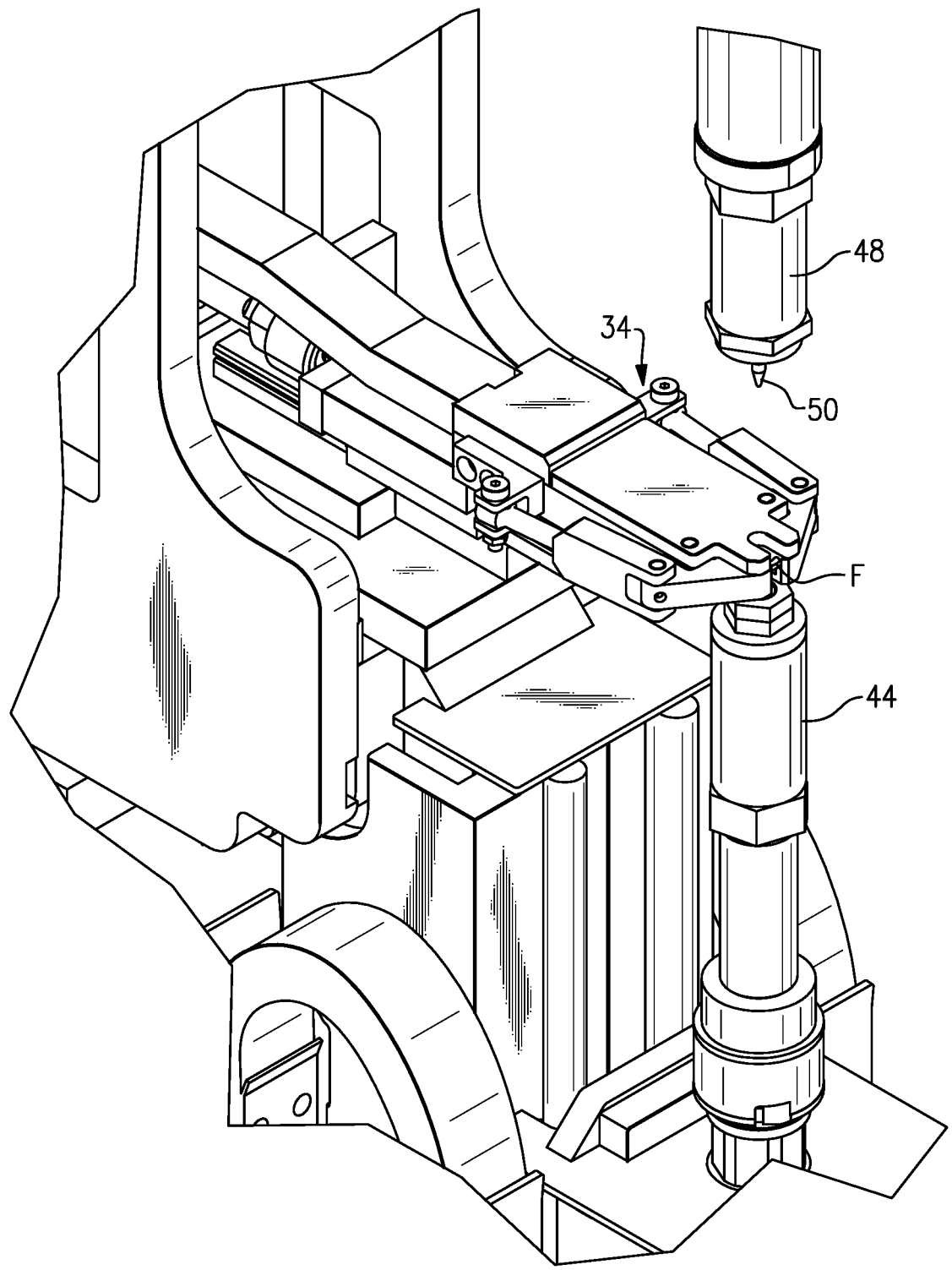
FIG. 5B is an enlarged perspective view depicting the feeder in a feeder advanced position and the electrode in the electrode advanced position.
Figure 5C:
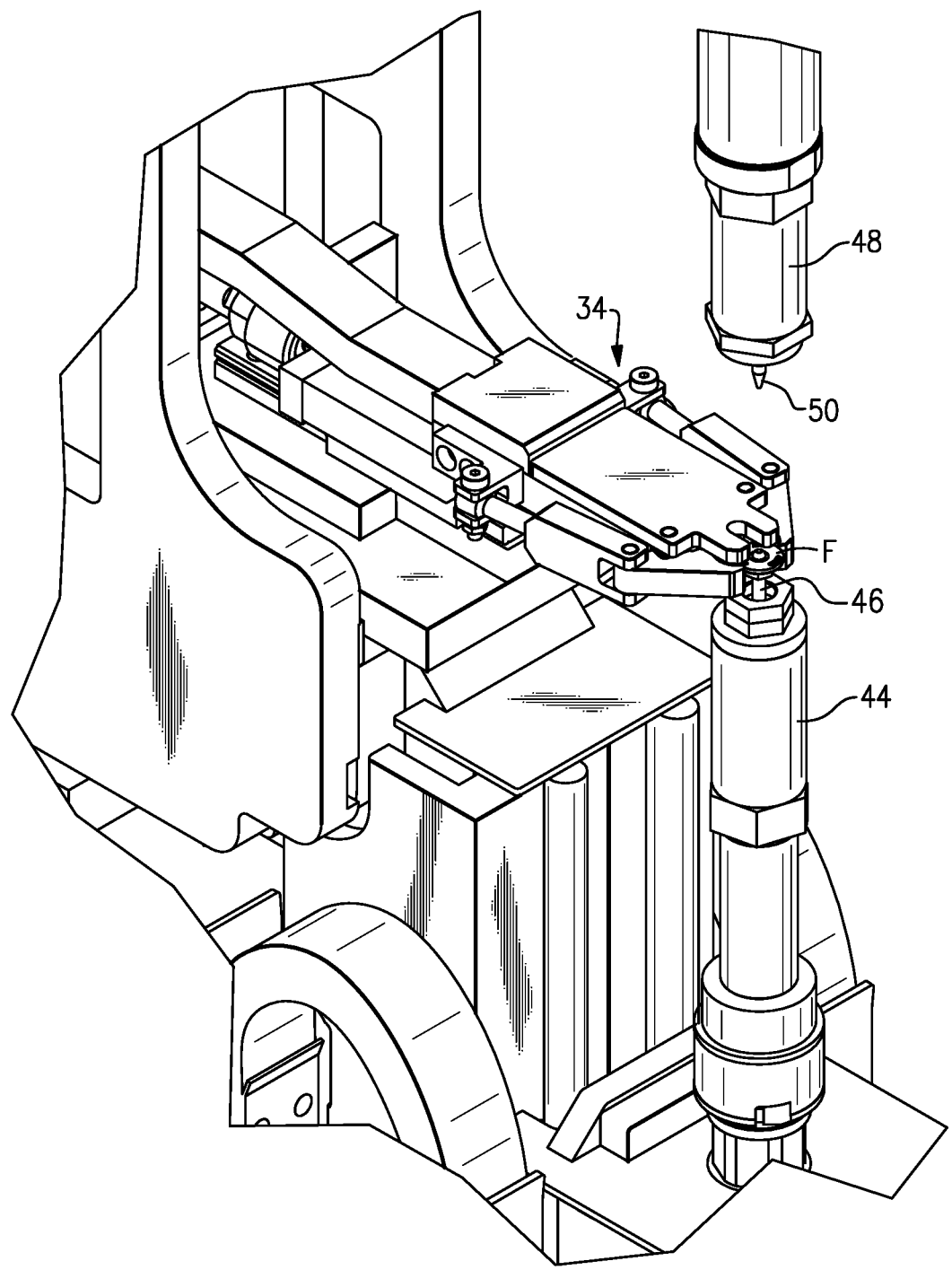
FIG. 5C is an enlarged perspective view depicting the pin in a pin advanced position and the fastener feeder moving from the feeder advanced position to the feeder retracted position.
Figure 5D:
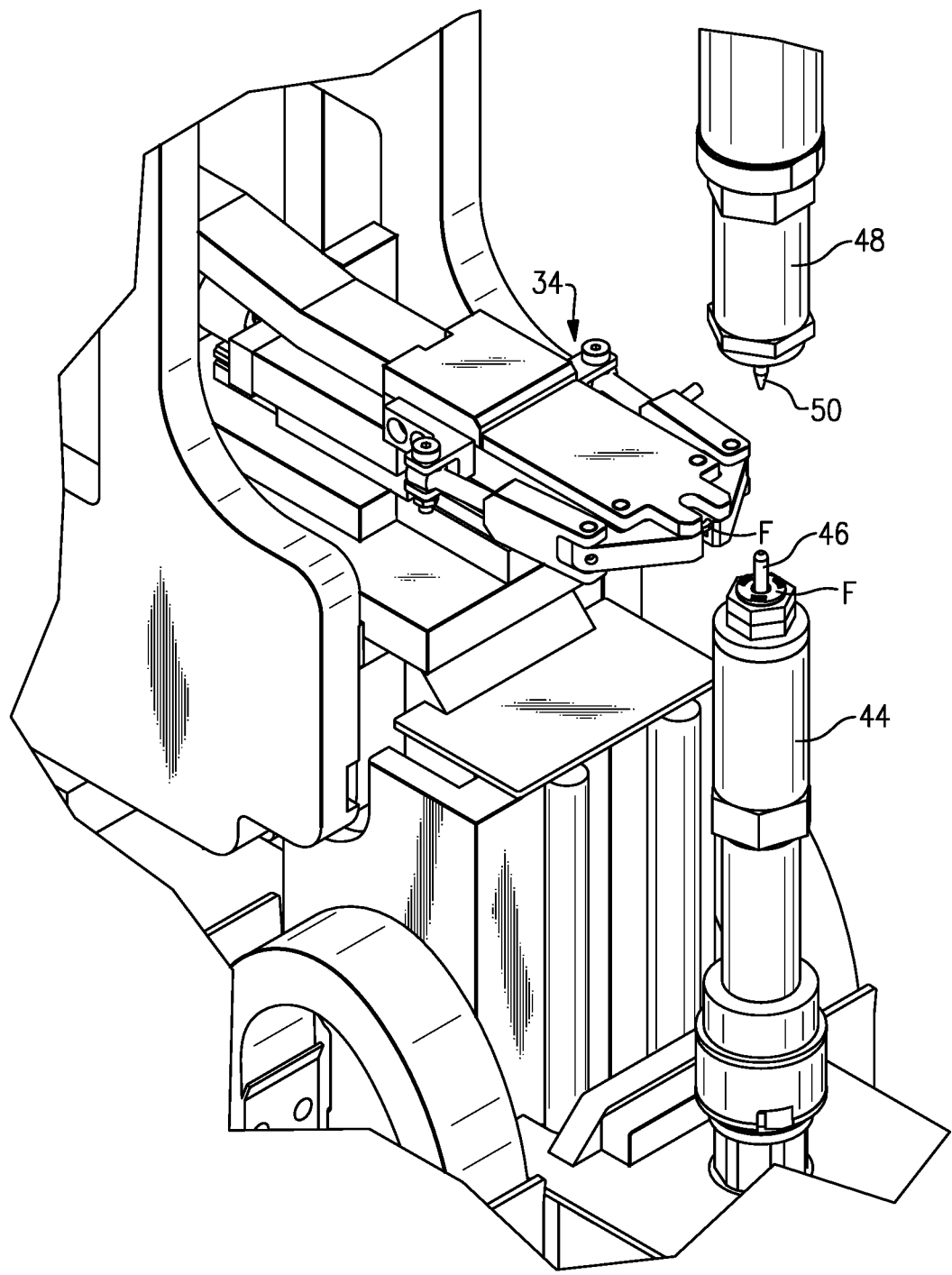
FIG. 5D is an enlarged perspective view depicting the pin in the pin advanced position and the fastener feeder in the feeder retracted position.

The configuration of the welding machine frame 30 illustrated in FIG. 3 is a generic design for illustration purposes. The welding machine frame 30 can be a standardized version or a custom design created for a specific application. The welding machine frame 30 can stand alone, it can be mounted to a frame that supports the other components of the welding system 10, or it can be incorporated into a larger piece of equipment providing multiple functions. The C-type resistance welding gun 32 shown employs a welding actuator 38 that moves the electrode in a linear motion towards an opposing stationary welding electrode 48 (FIG. 4). Linear motion is desirable for projection welding because it is most effective for providing consistent force on each projection and to follow the projection collapse during the weld.

The resistance welding gun 32 can be of any design, construction or material that achieves the requirements for the particular project scope. The welding actuator illustrated is an electric servo type but it could also be a pneumatic cylinder with an intermediate stroke position, such as a retract cylinder or other similar device.

FIG. 4 shows elements of the welding machine 16 in more detail. The resistance welding gun 32 includes two spaced apart welding gun side frames 40 and 42 that provide the main structure to hold the components of the gun, contain the welding force, and provide a means for mounting within the welding machine 16. A moveable welding electrode 44, containing a fastener rough locating pin 46, is connected to the output shaft of the welding actuator 38. A stationary welding electrode 48 containing a fastener locating pin 50, opposes the moveable welding electrode 44. The fastener locating pin 50 is actuated by a locating pin cylinder 52 and its position is sensed by a locating pin position sensor 53.

Examples relating to suitable pin position sensing can be found in U.S. Pat. No. 6,576,859, entitled "Resistance Welding Fastener Electrode," issued Jun. 10, 2003 and PCT International Application No. PCT/CA2014/050896, entitled "Welder with Indirect Sensing of Weld Fastener Position", filed Sep. 18, 2014, which are incorporated by reference herein in their entirety.

The sensor(s) can be used to track the electrode and welding pin movement to monitor situations that might generate an error leading to a defective part or a fault in the welding system 10. For example, if the pin locating the fastener is depressed when the welding gun closes on the workpiece presented by the robot, the workpiece may not have a clearance hole, or the workpiece may have slipped in the robot gripper too far for the floating action of the welding unit to accommodate (discussed in more detail below). The control system 20 in this case can instruct the robot 14 to deliver the workpiece to a containment area and pick up a new workpiece from the drag conveyor 12. In another example, if the electrode is not closed to the expected height, there may be an improper workpiece, fastener, or perhaps two fasteners. In this scenario, the system may first try to eject the fastener and reload. If the same error occurs, the workpiece is replaced as above.

The stationary welding electrode 48 and fastener locating pin 50 are specifically designed to suit the thickness of the workpiece W plus the clearance hole and fastener F locating diameter. The fastener locating pin 50 needs to be designed with gentle and smoothly transitioned curves to help urge the resistance welding gun 32 into the correct position. Excessive roughness, sharp angles, or steps on the fastener locating pin 50 may cause the pin to hang up on the workpiece, thereby inhibiting the locating pin cylinder 52 from advancing the fastener locating pin 50 to its fully extended position. Significant deviation of the workpiece W hole location can be accommodated by this arrangement. The maximum deviation would be in the range of 40% of the fastener thread being gaged. Our demonstration system is somewhat higher—providing a 5 mm window of compensation for a fastener having an 8 mm thread.

The stroke and force capability of the locating pin cylinder 52 needs to be sufficient to overcome the force applied to the fastener rough locating pin 46 in the movable welding electrode 44.

Figure 8:
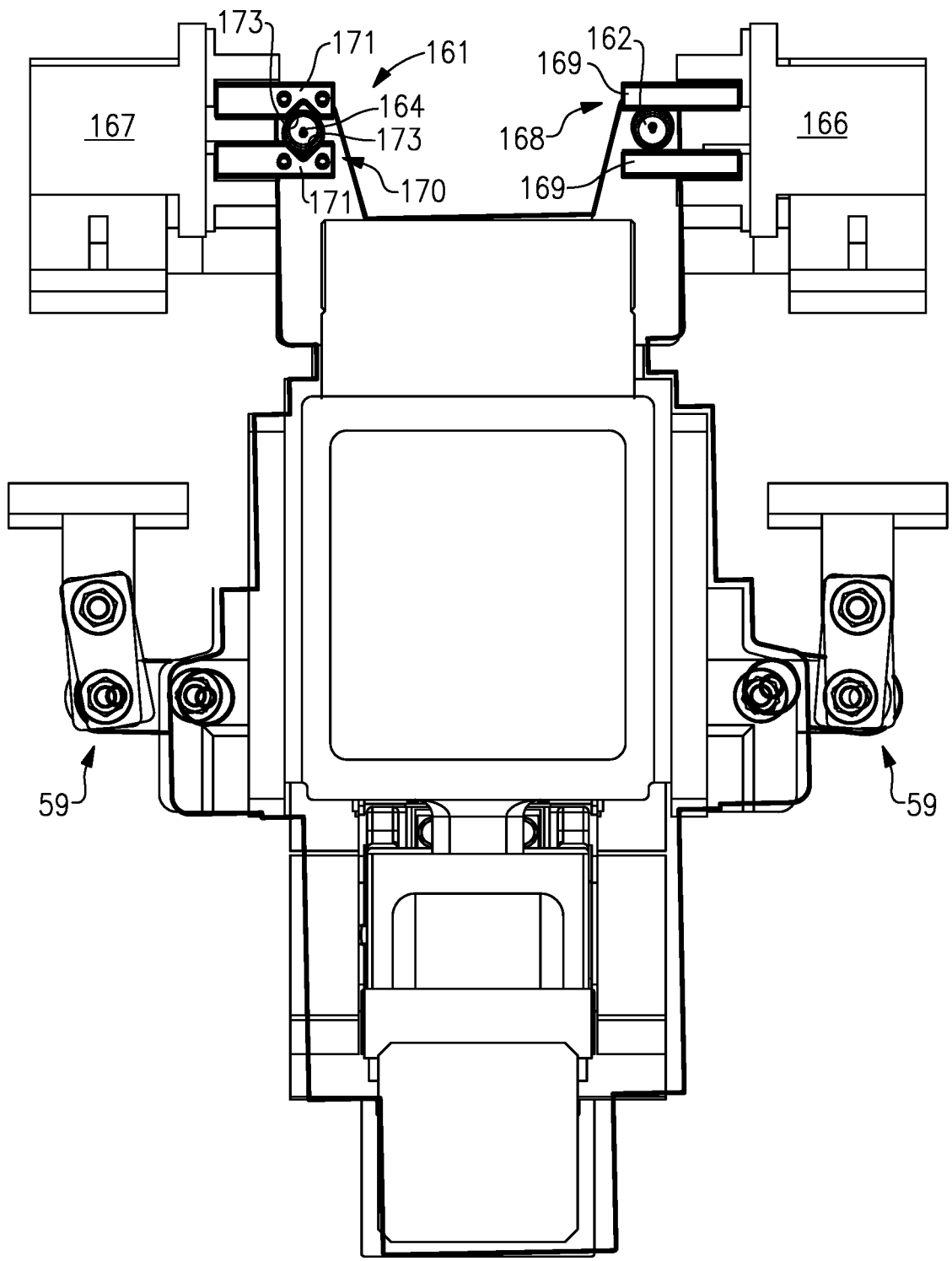
FIG. 8 is a top view of the resistance welding gun with another example homing assembly and illustrating the home position in solid lines and the random location in broken lines.
Figure 9:
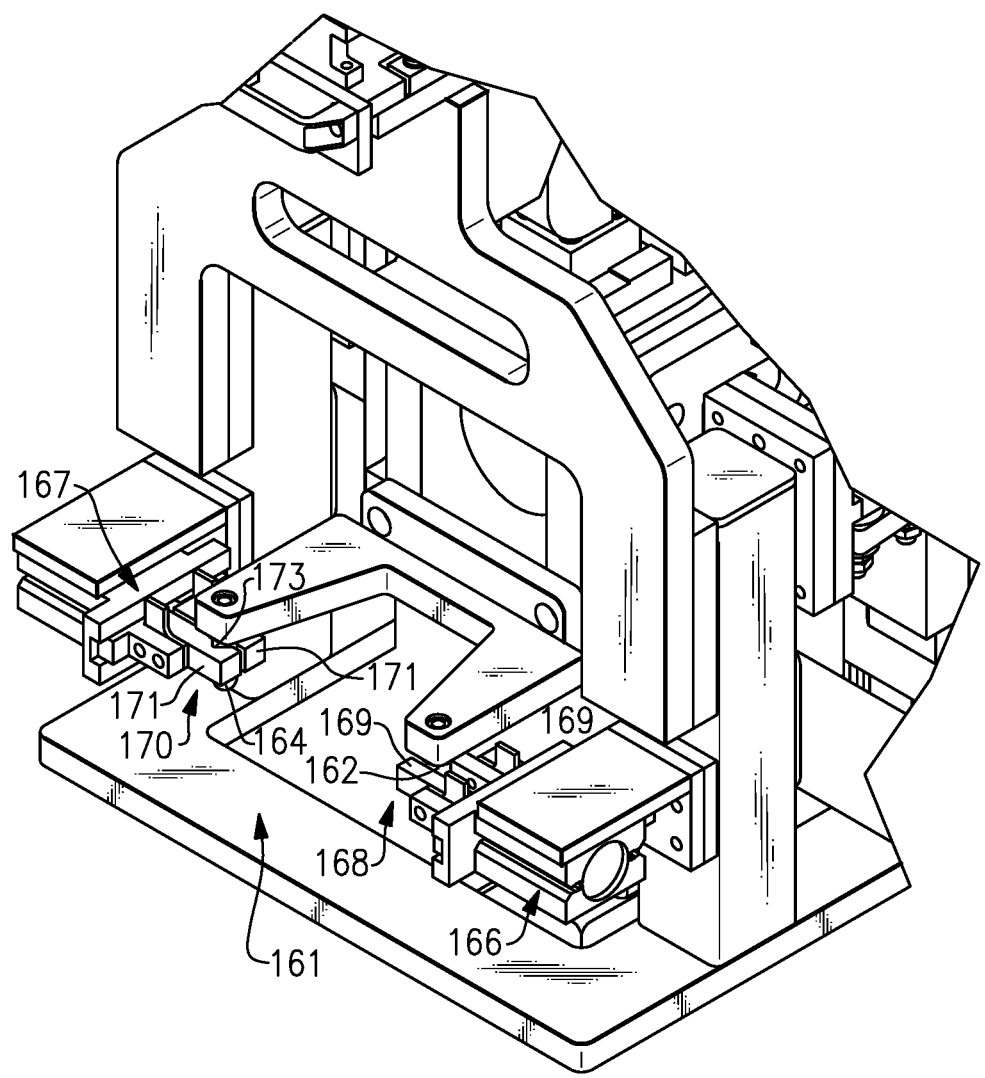
FIG. 9 is a perspective view of the homing assembly shown in FIG. 8.

The resistance welding gun 32 is connected to the machine frame 30 by one or more float assemblies 59 which permit motion within a plane. For simplicity, the description of one mechanism will be described although FIG. 4 shows there is one such mechanism located on opposing sides of the resistance welding gun 32. The planar alignment of bracket 54 on frame with the bracket 56 on welding unit is provided by link 58 to frame and link 60 to welding unit. Pins and bearings are provided at the attachment points between the components of this mechanism to enable welding gun 32 to float freely relative to the frame 30. A homing assembly 61 includes a homing actuator 66 that engages guide pins 62 and 64 to urge the resistance welding gun to a fixed home position that is the nominal position of the fastener locating pin 50 where the high-speed robot 14 has been programmed to position the clearance hole for the fastener locating pin 50. The float assembly 59 and homing assembly 61 illustrated in FIG. 4 are shown in more detail in FIGS. 7A-7B. Alternative configurations are illustrated in FIGS. 8-9.

The resistance welding gun 32 of FIG. 4 provides clearance between the welding gun side frames 40 and 42 to accommodate the feeder 34. Like the welding gun side frames 40 and 42, the feeder 34 represents a potential point of interference between the resistance welding gun 32 and the workpiece or high-speed welding robot gripper so it is desirable to keep it out of the way and this is accomplished by putting it in the throat of the resistance welding gun 32. The feeder 34 is commonly provided with components, such as fasteners, from an automatic feeding system by way of a tube, track, or carrier (e.g., vibratory feeder bowls 17a, 17b shown in FIG. 1). The feed path required to accommodate this apparatus can be quite long and it can be provided for and accommodated within the welding machine frame 30.

To load the component such as a fastener, the rod of the welding actuator 38 is advanced (with the feeder 34 in the feeder retracted position) to raise the movable welding electrode 44 to the electrode advanced position (FIG. 5A) necessary to interact with the feeder 34. The feeder 34 advances in a linear motion to a feeder advanced position (FIG. 5B) where the fastener is aligned with the fastener rough locating pin 46. At this time, the fastener rough locating pin 46 is advanced to its fully extended pin advanced position (FIG. 5C) to capture the fastener. Then the feeder 34 is withdrawn to its home feeder retracted position (FIG. 5D), the action of which causes the feeder 34 to release the fastener on the fastener rough locating pin 46. With the feeder 34 clear of the moveable welding electrode 44, the welding actuator 38 is free to advance the moveable welding electrode 44, as soon as the high-speed welding robot 14 confirms it has placed a workpiece over the fastener locating pin 50 in the stationary welding electrode 48.

Figure 6B:
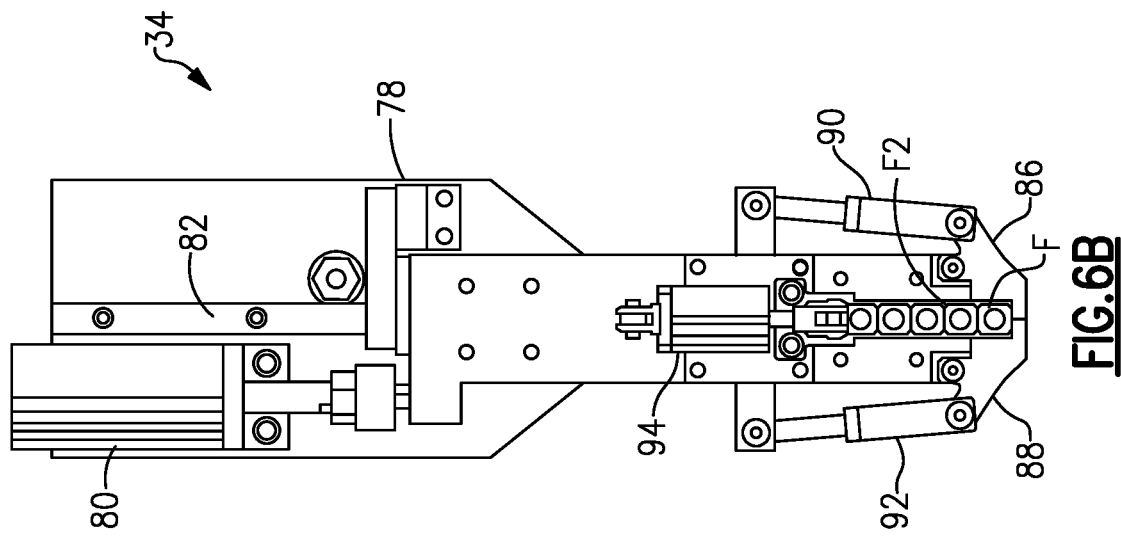
FIG. 6B is a top view of the feeder for loading a fastener with components removed to show an internal queue of fasteners.
Figure 6A:
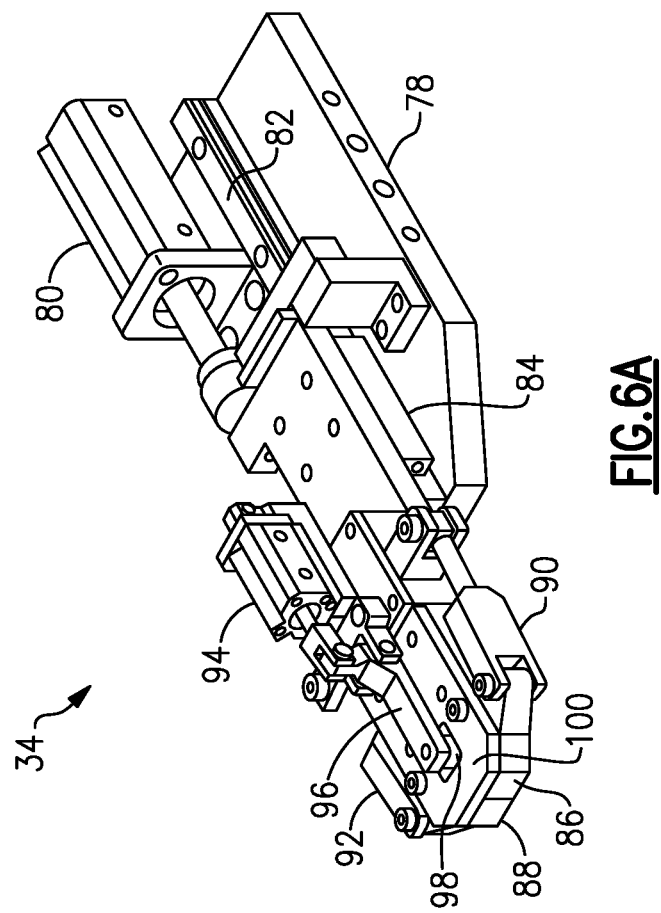
FIG. 6A is a perspective view of another feeder for loading a fastener.

FIG. 6A is a perspective view of the feeder 34. The feeder mounting plate 78 is used to establish a fixed position relative to the resistance welding gun 32 or welding machine frame 30. A slide bar 82 engages a slide body 84 to which an escapement assembly is mounted so it can move between a returned position and an advanced position, which corresponds to feeder retracted and feeder advanced positions. The two articulating jaws 86 and 88 are biased in contact with each other by the springs 90 and 92 respectively. A top plate 100 and bottom plate cooperate with the jaws 86 and 88 to form a chamber which holds a fastener F in preparation for loading onto the fastener rough locating pin 46. FIG. 6B is a top view of the feeder 34 with the clamp arm 96, clamp pad 98, and top plate 100 removed to show fastener F, retained fastener F2, and other fasteners queued for feeding to the welding machine 16. A clamp cylinder 94 drives a clamp arm 96 that supports a clamp pad 98 to capture retained fastener F2 which is immediately adjacent and in contact with the fastener F which will be loaded onto the fastener rough locating pin 46.

The feeder 34 of FIGS. 6A and 6B, receives fasteners from an external system that sorts, orients and delivers fasteners. When the moveable welding electrode 44 is in position to receive a fastener F, a signal is given by the control system 20 to actuate the advance cylinder 80. The slide body 84 moves along the slide bar 82 to advance the escapement mechanism into the position where the hole in fastener F will align with the fastener rough locating pin 46. The control system 20 provides a signal to operate clamp cylinder 94 which drives clamp arm 96 to press clamp pad 98 against retained fastener F2. When the advanced position has been reached, the control system 20 provides a signal to advance the fastener rough locating pin 46 to its fully extended position at which it engages the fastener F. At this point in the sequence, the advance cylinder 80 retracts. The engagement of the fastener rough locating pin 46 with fastener F prevents fastener F from moving. The force of fastener F transferred to jaws 86 and 88 causes them to act against springs 90 and 92 so they will open to release fastener F. The feeder 34 therefore returns to a position clear of the moveable welding electrode 44, after having deposited fastener F on the fastener rough locating pin 46. Advance cylinder 80 retracts to release the clamp pad 98 to release retained fastener F2 so that it can advance to the position of fastener F.

The size and configuration of feeder 34 must be appropriate for the dimensions and requirements of a specific fastener F. Such fasteners are widely varied in thread type, size, and length; and other attributes such as pilot diameters, stepped faces, number and type of projections. The shape of the jaws 86 and 88 must be suitable to provide a channel which guides and contains the fastener F, plus permits fastener F to force the jaws 86 and 88 open when the advance cylinder 80 retracts. The size of the clamp pad 98 and the length of clamp arm 96 will depend largely on the diameter or effective size of the fasteners F and F2 so that fastener F2 is properly retained and there is no interference with fastener F that impairs the reliability of its ejection and placement. For suitable operating life, the components of the feeder 34 in contact with the fasteners need to be made of hardened materials that resist wear from impact and sliding friction. The cycle time of this feeding operation is very fast—typically 0.3 seconds or less.

While FIGS. 6A and 6B illustrate a fastener F that is a projection weld nut for resistance welding, the component could be any of a variety including a pin, stud, or bracket. The shape of the jaws 86 and 88 would need to be suitable for the shape of the component and feeding function. The configuration of clamp pad 98 would be similarly changed to match the requirements to secure the retained fastener F2. This may involve for example, a pin to engage the hole in retained fastener F2 or a barrier to impede the travel of fastener F2 or provide separation between the retained fastener F2 and fastener F.

In another example, the clamp cylinder 94, clamp arm 96 and clamp pad 98 may be eliminated (as shown in FIGS. 5A-5D). In this case, gravity urges the fasteners F to the end of the feeder 34. The control system 20 tracks the number of fasteners F inside the feeder 34, which is determined by the fastener size, to ensure a sufficient urging force. Since the releasing operation happens so fast, with the clamp jaws 86, 88 following the contour of the fastener F there is no opportunity for a second fastener F2 to be released although there is no means for retention.

Figure 7A:
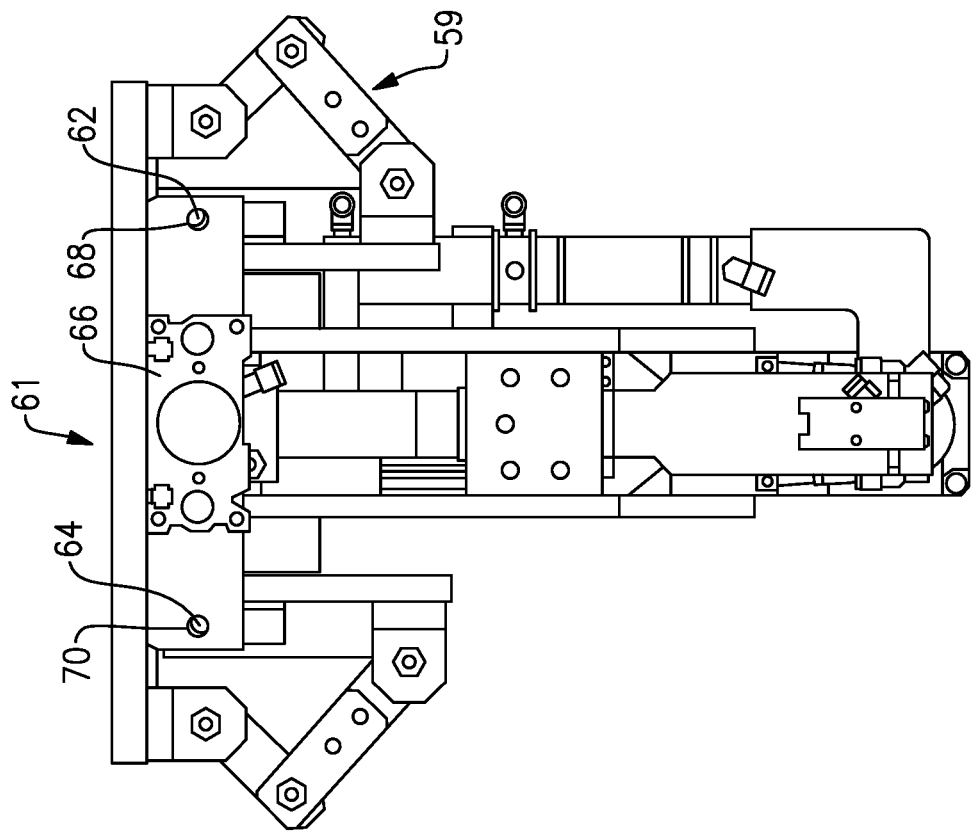
FIG. 7A is a top view of the resistance welding gun in the home position with one example homing assembly.
Figure 7B:
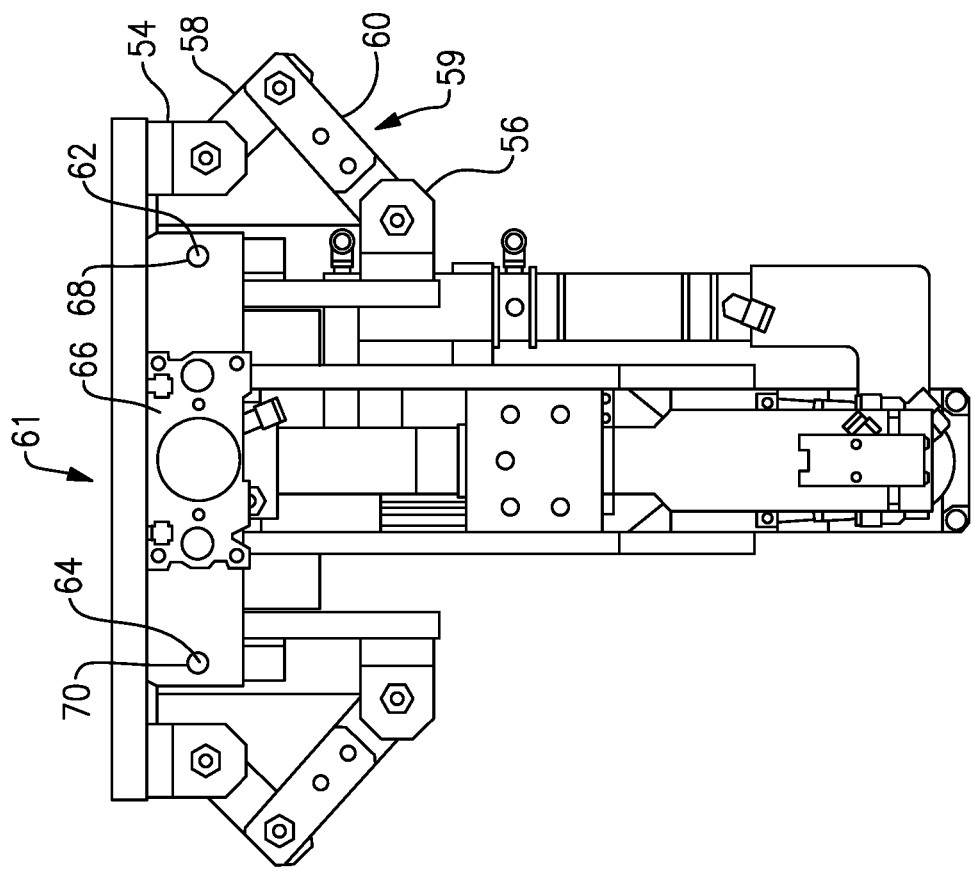
FIG. 7B is a top view of the resistance welding gun positioned in a random location required to accommodate a welding position.

While waiting to receive the workpiece from the high-speed robot 14, the resistance welding gun is locked into a fixed position by the homing actuator 66 advancing over guide pins 62 and 64, as shown in FIGS. 4 and 7A-7B. This fixed position provides the high-speed robot with a target to align the fastener clearance hole in the workpiece W with the fastener locating pin 50 in the stationary welding electrode 48. Once the high-speed robot 14 has completed the transit to the load position, the workpiece W will be in close proximity or resting against the stationary welding electrode 48. The homing actuator 66 is then retracted to permit the resistance welding gun 32 to move freely in the plane of the weld. When the locating pin cylinder 52 advances the fastener locating pin 50 through workpiece W, any misalignment between the fastener locating pin 50 and the hole in the workpiece W will cause a force on one side of the locating pin 50. This force will urge the resistance welding gun 32 to move in the plane of the weld into a compliant position where the fastener locating pin 50 is centered in the hole in the workpiece W and engaged with the fastener F on the other side. To fully extend, the fastener locating pin 50 must push the fastener rough locating pin 46 out of the fastener F and back into the moveable welding electrode 44. The locating pin position sensor 53 verifies that the fastener locating pin 50 has reached the desired stroke extension and the displacement conforms with expectations.

To move the resistance welding gun 32 relative to the fixed welding machine frame 30, the distance between the bracket 54 on frame and bracket 56 on welding unit will change. The change in the mounting bracket distance is easily accommodated by changing the angle between the link 58 to frame and link 60 to welding unit. The link to welding unit 60 incorporates provisions for adjusting the tension against the link to frame to ensure there is not excessive binding or looseness that impairs the function of the float assembly 59.

For small assemblies, where the mass of the part is unlikely to affect the welding process, when the electrodes are closed on the workpiece W and fastener, the high-speed robot 14 may release the workpiece W to return to the drag conveyor 12 for another workpiece W. If there is an additional fastener F or fasteners to be welded, or the mass of the weldment is too much, the high-speed robot 14 will continue to hold the workpiece W. Then the welding process is completed to secure the fastener W to the workpiece W. If the assembly weldment was released, the action of opening the resistance welding gun 32 by retracting the welding actuator 38 will free the welded assembly to fall onto the unload chute 18 to be discharged from the machine.

If there is a requirement to weld additional fasteners the feeder 34 operating sequence and welding sequence can be repeated as soon as the moveable welding electrode 44 has returned to the feeder 34 cycling position. If the welding is complete, the high-speed robot 14 can move the assembly to the position where it can be released.

The force and stroke of the homing actuator 66 needs to be sufficient to engage the guide pins 62 and 64 urge the resistance welding gun 32 back to its home position. The travel speed of the homing actuator 66 and the shape of the guide pins 62 and 64 determine the rate at which the resistance welding gun 32 moves.

The mechanism for enabling the resistance welding gun 32 to move in the plane of the weld could be an air bearing or low-friction X-Y slide assembly. Other means for placing the fastener on the movable electrode can be used such as conventional spear type fastener loader. The homing actuator 66 and arrangement of guide pins 62 and 64 represents one way to guide the resistance welding gun 32 back to its home position. Tapered pins, wedges and expanding arbors or guides are examples of other devices for centering two items that are displaced from one another in one plane.

When the position of the hole provided in the workpiece W for access to the fastener F thread is not sufficiently accurate to be used for establishing the welding position of the fastener F, such as when the hole is cut by a laser slightly out of position, the principles of FIG. 4 can be applied to an external device which accomplishes the same function of urging the resistance welding gun 32 to a desired location, using a different hole or attribute of the workpiece W as a reference. In this case, another supplemental pin, performing the location function of the fastener locating pin 50 can be attached and driven by a supplemental actuator so that it can engage a hole or attribute of the workpiece that is desired for establishing the position of the fastener F in relation to the workpiece W. The supplemental actuator would advance the supplemental pin to engage the workpiece W. The shape of the pin would be selected to urge the resistance welding gun into the proper position for welding when it engages the workpiece W. Relocation of this function to the supplemental actuator and pin would not affect the ability of the fastener locating pin 50 to provide the function of monitoring and detecting the fastener F.

FIG. 7A is a top view of the resistance welding gun 32 in its home position with the guide pins 62 and 64 engaged in the homing guides 68 and 70 respectively. Each of the homing guides 68 and 70 provides a cylindrical hole corresponding to a 2-dimensional position within the plane of movement. The two homing guides 68 and 70 work together to fix the position of the fastener locating pin 50 which the high-speed robot 14 will target for workpiece placement in the next welding machine 16 operating cycle.

FIG. 7B is a top view of the resistance welding gun 32 in a position where the guide pins 62 and 64 are no longer engaged or aligned with the homing guides 68 and 70 respectively. This position is achieved when the homing actuator 66 retracts the guide pins 62 and 64 from the homing guides 68 and 70 and force applied on the fastener locating pin 50 urges the resistance welding gun 32 into such an alignment.

When the homing actuator 66 is activated to return the resistance welding gun 32 to its home position, the homing guides 68 and 70 will be forced against and over the guide pins 62 and 64 respectively. In the position where the homing actuator 66 is fully advanced, the guide pins 62 and 64 will be securely contained by the homing guides 68 and 70, as in FIG. 7A.

The homing guides 68 and 70 provide a cylindrical hole to establish a 2-dimensional position within the plane of movement and the two cooperate together to establish the home position of the resistance welding gun 32. The diameter of the cylindrical holes is determined by the diameter of the guide pins 62 and 64 with a minor amount of clearance necessary to ensure a slip fit. The guide pins 62 and 64 need to have a diameter sufficient to resist bending and a length accommodating the desired rate transition from the small diameter tip to the full diameter. The small diameter of the tip determines the maximum guide pin displacement at which the guide pins 62 and 64 can enter the homing guides 68 and 70. In most cases, the guide pins 62 and 64 and homing guides 68 and 70 should be hardened and have a low friction coating to prevent galling and binding. The spacing and position of the homing guides 68 and 70 is a function of the resistance welding gun 32 and the distance from the center of the homing guides 68 and 70 to the center of the fastener locating pin 50. The homing actuator 66 must have a force and travel speed sufficient to realign the guide pins 62 and 64 and homing guides 68 and 70 quickly and without excessive shock.

The hardware used to fix the position the resistance welding gun 32 can involve other approaches than described. For example, wedges or cams could be used in place of guide pins 62 and 64. The homing guides 68 and 70 could also be split lengthwise to close onto the guide pins 62 and 64 to reduce friction. Using such an approach, the solid guide pins 62 and 64 could be surrounded or replaced with rollers to further reduce friction during repositioning.

Another homing assembly 161 is shown in FIGS. 8 and 9. The homing assembly 161 uses a pair of homing guides 168, 170 that respectively cooperate with guide pins 162, 164 to locate the welding unit to the home position. In the example, a first homing actuator 166 actuates a pair of arms 169 into engagement with opposing sides of the guide pin 162 to clamp the guide pin 162 and locate one side of the welding unit in a first direction within the horizontal plane. A second homing actuator 167 actuates a pair of arms 171, which include notches 173, into engagement with opposing sides of the guide pin 164 to clamp the guide pin 164 and locate the other side of the welding unit in both first and second directions within the plane. The first and second actuators 166, 167 are typically operated simultaneously to locate both sides of the welding unit in the home position within the plane. The arms 169, 171 are moved out of engagement with their respective guide pins 162, 164 to permit the welding unit to float.

Figure 10:
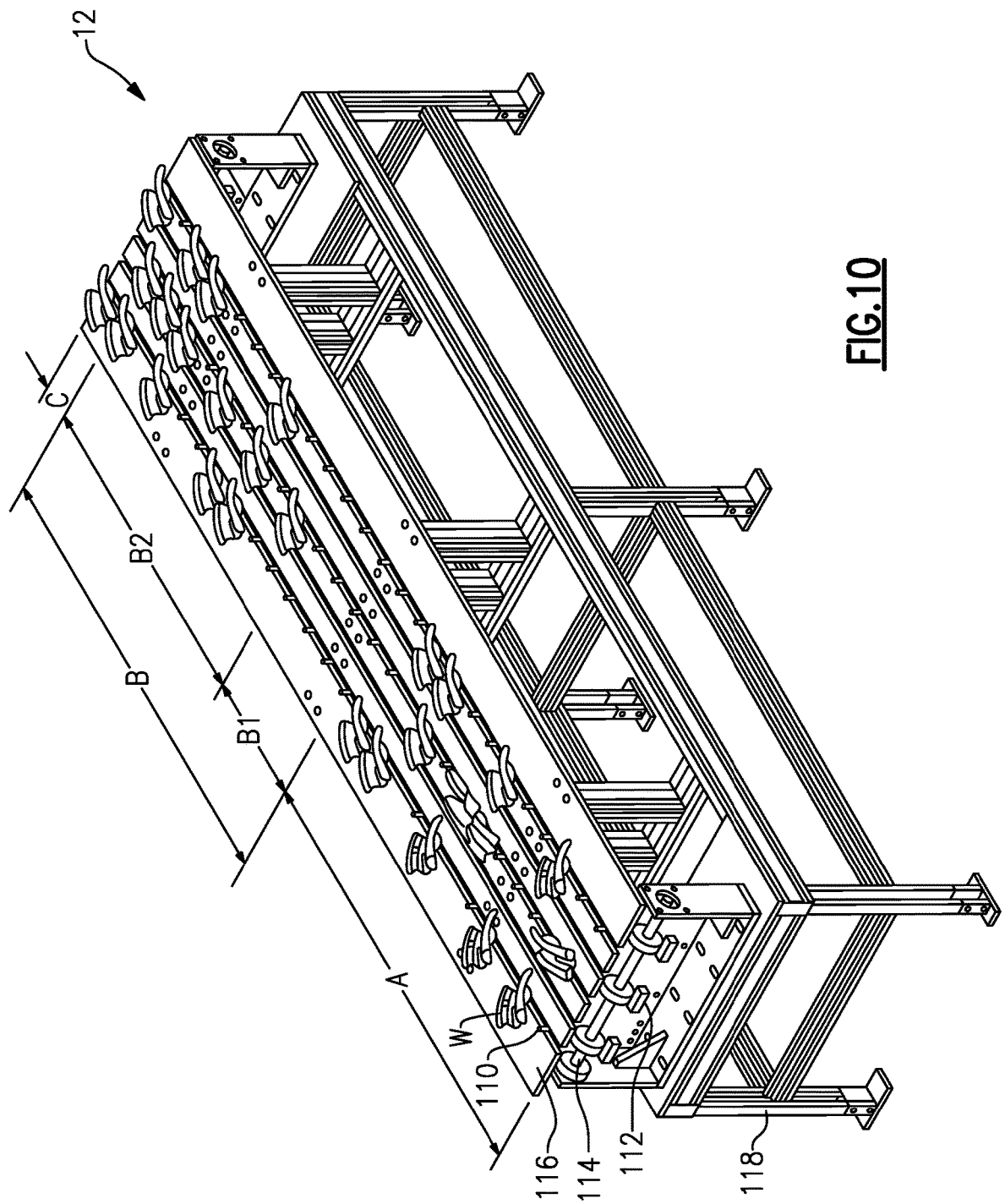
FIG. 10 is a perspective view of a part conveyor with random workpiece placement.

FIG. 10 is a perspective view of the drag conveyor 12 with the addition of a number of workpieces W. The workpieces W are engaged on number of evenly spaced transfer pins 110 are affixed to conveyor chains 112. Three such conveyor chains 112 are supported and driven by a sprocket assembly at each end of the drag conveyor 12. The conveyor chains 112 are aligned with spaces provided between adjacent friction bars 116 to permit the travel of the transfer pins 110 and thereby the workpieces W.

The workpiece W shown in FIG. 10 is used to illustrate the principles of operation and is not representative of the range and size of permissible workpieces W. While not defined in the hardware, a number of zones are illustrated in FIG. 10 to explain the operation of the drag conveyor 12. An operator loading zone A, is within easy reach of an operator who will manually sort, orient, and place a workpiece W so the selected attribute of the workpiece W, such as a specific hole, engages a transfer pin 110. Within zone A, the orientation of the workpiece W is not required to be precise and the number of occupied transfer pins 110, as well as the sequence in which they are loaded is not important. The sprocket assembly 114 drives the conveyor chains 112 to advance the transfer pins 110 towards the unloading zone C. Along the length of the drag conveyor there is a workpiece orientation zone B in which the friction of the workpiece W acting against the friction bar 116 urges the workpiece W into a generally consistent orientation. Also illustrated is an empty zone B1 which corresponds to a time when the operator was unable to load a workpiece W. This could be for any number of reasons such as when convenient access to workpieces W is not possible. This could occur when there is an interruption of the supply of workpieces, such as might occur when the container holding them is empty and requires replacement. In the oriented part zone B2 the workpieces are progressively oriented such that when leaving this zone and entering the unloading zone C, they are in a position identifiable by the high-speed robot 14.

In the unloading zone C, a detection method would be employed so the control system 20 can communicate the workpiece W location to the high-speed robot 14. The detection method could be an inductive proximity switch, photo switch, laser, or imaging system. The detection method could detect and verify the workpiece W in the unloading zone C each of the transfer path, or it could be incorporated into the high-speed robot 14 tooling that is used to capture the workpiece W for loading into the welding machine. The drag conveyor 12 would be advanced to position at least one workpiece W in the unloading zone C within reach of the robot. The high-speed robot 14 could wait until a workpiece W has reached a fixed unloading position, or it could capture the workpiece while it is moving within the unloading zone C if the drag conveyor 12 and high-speed robot 14 are operated in coordinated motion.

The detection method employed to detect and verify the workpiece W is within the unloading zone C can also be used to verify an attribute of the workpiece W so that a misaligned or incorrect workpiece W can be discharged from the drag conveyor 12 simply by moving it past the point at which the workpiece W remains engaged with the friction bars 116 and transfer pin 110.

The conveyor frame 118 shown in FIG. 10 is illustrative only. It can be a free-standing unit as shown or integrated with the frame supporting other components of the welding system 10. The number and length of conveyor chains 112 is dependent on the number and spacing of transfer pins 110 required to support the welding system 10 operating requirements. The transfer pins 100 may not have a circular cross section and of any length required to engage the workpiece W while it is resting on a surface. The length and definition of the illustrated drag conveyor 12 zones is a function of the welding system 10 operating requirements and other factors such as machine guarding, and the duration of friction application required to ensure the workpieces W are consistently oriented. The friction bar 116 would commonly be made of sheet or plate steel with a width, length, and thickness suited to the size of the workpiece W. Instead of changing the length of transfer pins 110 to suit different workpieces W, provision can be made to change the spacing between the friction bar 116 and conveyor chain 112.

The drag conveyor 12 shown in FIG. 10 is an example configuration. The transfer path does not need to be linear as illustrated. The transfer path could be circular as a rotary table, a serpentine shape, or have transitions to different shapes along the length of travel. The transfer path also does not need to be in one plane or in a plane parallel to the floor. The conveyor chain 112 can be driven by any number of means such as the high-speed robot 14 controller to provide for coordinated motion, a speed-controlled motor, or a ratcheting drive connected to a pneumatic cylinder. The friction bars 116 can be made of any number of metal, other material such as self-healing polymer, or a combination of materials. The friction bars 116 may also be supplemented with risers or guides if, for example, they are beneficial to speed up workpiece W orientation, reduce the chance the workpiece W will lock on the transfer pin 110, or prevent motion that would cause interference between adjacent workpieces W. The space between friction bars could be occupied with conveyor chain 112 link, accessory, or cover that prevents the workpiece W from engaging with the gap between adjacent friction bars 116 if such engagement would prevent the workpiece W from moving to the desired alignment.

An example operating sequence of each of the principle welding system 10 components is as follows. The equipment operator or automation will load workpieces on the drag conveyor 12 whenever there is an available station within reach. The drag conveyor 12 will advance workpieces W towards the unloading zone C whenever there are no workpieces W properly oriented for pick-up within the unloading zone C. The high-speed robot 14 will move to position to engage a workpiece W when it is free to begin the transfer sequence and a workpiece W has been detected in an orientation conducive to engagement. When the resistance welding gun 32 is opened sufficiently to accept the high-speed robot 14 to load a workpiece W, the high-speed robot 14 will move the workpiece W to a position in alignment with the stationary welding electrode 48. Independently, or simultaneously with the operation of the high-speed robot 14, when the moveable welding electrode 44 has been moved by the welding actuator 38 to the position to receive the fastener F from the feeder 34, the feeder 34 will advance to the location in which the fastener F is aligned with movable welding electrode 44. The fastener rough locating pin 50 is then advanced to engage with the fastener F while the clamp arm 96 advances to bring the clamp pad 98 into contact with the retained fastener F2. The feeder 34 is then retracted to its rest position, the action of which causes the jaws 86 and 88 to move against the biasing springs 90 and 92 to release the fastener F. When the feeder 34 has retracted, the fastener F will be raised towards the workpiece W by the movable welding electrode 44 on which it is resting. When the welding actuator 38 reaches the travel distance at which the workpiece W and fastener F should be in contact between the moveable welding electrode 44 and stationary welding electrode 48, homing guide pins 62 and 64 will be released from the homing guides 68 and 70. The fastener locating pin 50 will then advance to monitor and verify the part position as well as to bring the parts to be welded, if present, into alignment by urging the resistance welding gun 32 to move. The welding machine 16 will perform the welding operation. When the workpiece W does not require an additional fastener F and can be supported by the welding electrodes, the high-speed robot 14 will disengage from the workpiece W and move to retrieve another workpiece W from the drag conveyor 14. Otherwise, it will continue to hold and support the workpiece W until the moveable electrode 44 has retracted sufficiently to either permit the high-speed robot 14 to index the subassembly to the next welding position, or to release the completed assembly so it can exit the welding system 10. The welding actuator 38 will return the moveable welding electrode 44 to its fully lowered position to begin the fastener feeding and welding cycle over again.

The disclosed welding system welds fasteners at high speeds to maximize labor productivity while reducing complexity to minimize downtime and capital cost. Both the equipment and operator productivity are improved by freeing the operator from having to load components synchronously with the welding machine cycle. When the operator can grab a number of workpieces from the storage bin and load them into the equipment at a higher rate than the equipment cycle time, the time required for the operator to get more workpieces from the bin can be buried in the system cycle time so the welding process can proceed at the maximum production rate of the welding machine.

Maximizing the production rate allows the capital cost of the welding machine or assembly processes to be amortized over more assemblies. In addition to the labor savings that comes from increasing the rate of production welding, increased production volume provides an opportunity to amortize the cost of any supplemental error avoidance systems over more assemblies.

The system provides sufficient speed, versatility, and reliability to be located in the stamping bay where the stampings are produced or where injection molding occurs to eliminate storage of inventory and extra material handling.

It should also be understood that although a particular component arrangement is disclosed in the illustrated embodiments, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of manufacturing an assembly, the method comprising the steps of:
    loading a workpiece into a securing station having a gun supported by a frame in a home position, the gun is configured to secure a component to the workpiece in a securing position during a securing operation, the gun misaligned with the workpiece in the home position;
    advancing at least one of first and second members of the gun to engage the workpiece, the at least one of the first and second members having a locating pin;
    causing a force on one side of the locating pin in response to the advancing step and any misalignment with the locating pin and a hole or attribute of the workpiece;
    urging the gun to glide relative to the frame between the home position and the securing position in response to the force on the one side of the locating pin thus centering the locating pin with the hole or attribute; and
    securing a component to the workpiece at the securing station in the securing position.

2. The method of claim 1, wherein the component is a fastener, the securing station is a welding station, the component is a fastener, and the securing step includes welding the fastener to the workpiece.

3. The method of claim 2, wherein the first member is a first electrode, and the second member is a second electrode movable between electrode retracted and electrode advanced positions, and the locating pin is provided on the second electrode, wherein the locating pin is movable between pin advanced and pin retracted positions with the second electrode in the electrode advanced position.

4. The method of claim 3, comprising a step of evaluating the second electrode and locating pin positions to identify, contain, and remediate workpiece and operating fault conditions.

5. The method of claim 4, comprising a step of referencing a schedule of parameters corresponding to a number of assembly configurations.

6. The method of claim 1, wherein the loading step includes the step of transferring the workpiece with a robot to the securing station with the securing station in the home position, and the urging step includes releasing the gun from the home position subsequent to performing the step of robotically transferring the workpiece.

7. The method of claim 6, wherein the workpiece is held by the robot during the securing step.

8. The method of claim 6, comprising a step of unloading the workpiece with the robot subsequent to the securing step, and comprising the step of relocating the securing station to the home position subsequent to the securing step.

9. The method of claim 6, comprising a step of picking up a part off of a drag conveyor prior to the loading step.

10. The method of claim 1, comprising a step of moving the gun to the home position.

11. The method of claim 10, comprising a step of locking the gun in the home position, the locking step performed prior to the causing step.

12. The method of claim 1, wherein the urging step includes floating the gun in a plane in X- and Y-directions.

* * * * *